(12) United States Patent
Hwang et al.

(10) Patent No.: US 8,983,906 B2
(45) Date of Patent: Mar. 17, 2015

(54) METHOD AND APPARATUS FOR CREATING/PLAYING A CONTENT FILE

(75) Inventors: Seo-Young Hwang, Suwon-si (KR); Sung-Ryeul Rhyu, Yongin-si (KR); Jae-Yeon Song, Seoul (KR); Kyung-Mo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/574,740

(22) PCT Filed: Jan. 21, 2011

(86) PCT No.: PCT/KR2011/000448
§ 371 (c)(1),
(2), (4) Date: Jul. 23, 2012

(87) PCT Pub. No.: WO2011/090348
PCT Pub. Date: Jul. 28, 2011

(65) Prior Publication Data
US 2012/0296921 A1 Nov. 22, 2012

(30) Foreign Application Priority Data
Jan. 21, 2010 (KR) .................. 10-2010-0005772

(51) Int. Cl.
G06F 7/00 (2006.01)
H04N 5/913 (2006.01)
G06Q 30/02 (2012.01)
G11B 27/32 (2006.01)
H04L 29/06 (2006.01)
(Continued)

(52) U.S. Cl.
CPC ........... *H04N 5/913* (2013.01); *G06Q 30/0251* (2013.01); *G11B 27/322* (2013.01); *H04L 65/607* (2013.10); *H04N 21/4334* (2013.01); *H04N 21/47202* (2013.01);
(Continued)

(58) Field of Classification Search
CPC .......... G06F 17/3007; G06F 17/30176; G06F 17/30194; G06F 17/3028; G06F 17/3056; G06F 17/3089; G06F 3/0607
USPC ......................................................... 707/620
See application file for complete search history.

(56) References Cited

U.S. PATENT DOCUMENTS

| 2001/0054168 A1 | 12/2001 | Chung et al. |
| 2005/0086582 A1 | 4/2005 | Frojdh et al. |

(Continued)

FOREIGN PATENT DOCUMENTS

| KR | 100467615 | 1/2005 |
| KR | 1020070026118 | 3/2007 |

(Continued)

OTHER PUBLICATIONS

PCT/ISA/237 Written Opinion issued on PCT/KR2011/000448 (pp. 4).

(Continued)

*Primary Examiner* — Truong Vo
(74) *Attorney, Agent, or Firm* — The Farrell Law Firm, P.C.

(57) ABSTRACT

A real-time service method and apparatus for providing information generated in real-time mode are provided. The method includes generating, by a file generator a contents file including contents configuration related information and real-time service related information such that the contents configuration related information and the real-time service related information are separated within the contents file; and transmitting, by a transmitter, the generated file to a receiving device.

13 Claims, 5 Drawing Sheets

(51) Int. Cl.
*H04N 21/433* (2011.01)
*H04N 21/472* (2011.01)
*H04N 21/6587* (2011.01)
*H04N 21/845* (2011.01)
*H04N 21/854* (2011.01)

(52) U.S. Cl.
CPC ...... *H04N 21/6587* (2013.01); *H04N 21/8455* (2013.01); *H04N 21/8456* (2013.01); *H04N 21/85406* (2013.01); *H04L 65/4084* (2013.01); *H04L 65/602* (2013.01)
USPC .......................................................... 707/620

(56) References Cited

U.S. PATENT DOCUMENTS

| | | |
|---|---|---|
| 2005/0181967 A1 | 8/2005 | Ruland et al. |
| 2006/0092938 A1* | 5/2006 | Gentrix .................... 370/390 |
| 2006/0112222 A1 | 5/2006 | Barrall |
| 2006/0126479 A1 | 6/2006 | Koda et al. |
| 2007/0143807 A1 | 6/2007 | Suneya |
| 2008/0312010 A1* | 12/2008 | Marty et al. .................. 473/447 |
| 2009/0208119 A1 | 8/2009 | Lee et al. |
| 2011/0090953 A1* | 4/2011 | Melnyk et al. ........... 375/240.03 |

FOREIGN PATENT DOCUMENTS

| | | |
|---|---|---|
| KR | 1020090009300 | 1/2009 |
| KR | 100932142 | 12/2009 |
| WO | WO 2008/048046 | 4/2008 |

OTHER PUBLICATIONS

PCT/ISA/210 Search Report issued on PCT/KR2011/000448 (pp. 6).

* cited by examiner

METHOD AND APPARATUS FOR CREATING/PLAYING A CONTENT FILE

PRIORITY

This application is a National Phase Entry of PCT International Application No. PCT/KR2011/000448, which was filed on Jan. 21, 2011, and claims priority to Korean Patent Application Serial No. 10-2010-0005772, which was filed in the Korean Intellectual Property Office on Jan. 21, 2010, the entire contents of each of which is incorporated herein by reference.

FIELD OF THE INVENTION

The present invention relates generally to an apparatus and method for generating/playing contents of a file, and more particularly, to a method and apparatus for providing a real-time service.

DESCRIPTION OF THE RELATED ART

Multimedia streaming is a technology for providing a service in real time Examples of streaming include a data packet delivery method, a Video On Demand service allowing a user to view previously generated data at a desired time through a desired medium, etc.

Streaming media includes methods for transmitting and playing mainly multimedia data such as audio, video, etc. When a service is provided through a streaming scheme, data is played back by a reception terminal, as the data is received by the reception terminal, thereby remarkably reducing a waiting time caused by downloading an entire file before playing the file. By adopting streaming technology, data can be streamed on a computer network using a Digital Video (DV) camera, for example, and thus real-time relay of multimedia content is possible.

With respect to a video on demand service, when previously generated multimedia data is stored using a recording medium in a file format and owned by a server, the data is transmitted in response to a user request. Files are usually opened after being downloaded, but multimedia data, due to its large file size, may require a long period of time for downloading. Therefore, in order to reduce a time taken for providing a service, a progressive download technique is provided in which received data can be played before downloading of the file is completed.

As personalized contents as well as contents provided by designated service providing servers are increasingly provided, a recent service has a tendency toward a "pro-sumer" (a portmanteau of "provide" and "consumer") service in which a user becomes a service provider. The personalized contents also take a form in which the contents provided by the designated service providing servers are reprocessed and serviced, as well as a form of personally generated data.

However, in contrast to downloadable files, conventional streaming data cannot be stored and managed in a completed form, such that a reception side cannot store and process or reuse the streaming data. In using a file downloading service, even if a progressive download technique is provided, a file downloading service can provide the service only in a state where a single complete file is made when the format of data forming the single file is completely known in advance. Therefore, conventionally, there is no way to provide data in an utilizable, e.g., reusable, and storable form when the data is contents data whose final data form is not known in advance, such as real-time generated data.

SUMMARY OF THE INVENTION

The present invention is designed to address at least the above-described problems and/or disadvantages and to provide at least the advantages described below.

An aspect of embodiments of the present invention is to provide an apparatus and method for generating/playing a contents file to provide a real-time service for real-time generated information in a recording medium and a delivery medium which store or deliver information.

Another aspect of embodiments of the present invention is to provide an apparatus and method for generating/playing a contents file to provide real-time generated and delivered data in an utilizable, e.g., reusable, and storable form.

In accordance with an embodiment of the present invention, a method, performed by a transmitting device, for generating a contents file is provided. The method includes generating, by a file generator a contents file including contents configuration related information and real-time service related information in which such that the contents configuration related information and the real-time service related information are separated within the contents file; and transmitting, by a transmitter, the generated file to a receiving device.

In accordance with another embodiment of the present invention, an apparatus for generating a contents file is provided. The apparatus includes a file generator for generating a contents file including contents configuration related information and real-time service related information such that the contents configuration related information and the real-time service related information are separated within the contents file; and a transmitter for transmitting the generated file to a receiving device.

In accordance with further another embodiment of the present invention, a method for generating a contents file is provided. The method includes receiving, from a transmitting device, a contents file generated including contents configuration related information and real-time service related information such that the contents configuration related information and the real-time service related information are separated within the contents file; parsing, by a parser, the received file; and playing, by an output unit, the file based on the parsing result.

In accordance with yet another embodiment of the present invention, an apparatus for generating a contents file is provided. The apparatus includes a receiver for receiving, from a transmitting device, a contents file generated including contents configuration related information and real-time service related information such that the contents configuration related information and the real-time service related information are separated within the contents file; a parser for parsing the received file; and a player for playing the file based on the parsing result.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Hereinafter, various embodiments of the present invention are described in detail with reference to the accompanying drawings. In the following description of the present invention, a detailed description of known functions and configurations incorporated herein may be omitted when such a description may obscure the subject matter of the present invention.

The terms or words used in the specification and claims described below are not limited to their typical or encyclopedic meanings, but are to be construed according to meanings and concepts that are coincident with the technical concepts of the present invention.

In accordance with an embodiment of the present invention a method for providing a real-time service of information generated in real time, and a method and apparatus for providing real-time generated and delivered data in an utilizable, e.g., reusable, and storable form in recording medium and delivery medium which store or deliver information are provided.

The following description according to embodiments of the present invention, refers to particular file formats as one of a recording medium and a delivery medium that stores or delivers information. However, embodiments of the present invention are applicable to a variety of data formats that can be used to record, transmit, deliver, and store data.

Before describing a file format proposed according to an embodiment of the present invention, a block structure of a media file format based on the International Organization for Standardization (ISO)/the International Electrotechnical Commission (IEC) 14496-12 standard is described as follows with reference to FIG. 1.

Figure 1:
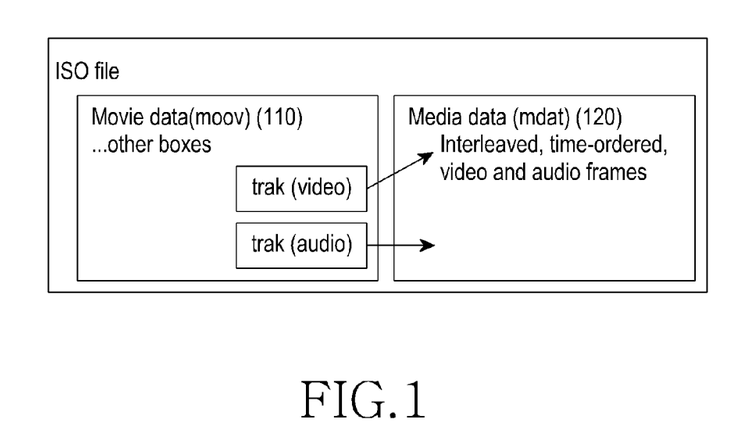
FIG. 1 is a block diagram of a storing format of general contents.

FIG. 1 is a block diagram illustrating a storage format of general contents.

Referring to FIG. 1, an ISO file includes a movie data box 'moov' 110 and a media data box 'mdat' 120. Although not shown in FIG. 1, the ISO file also includes a file type box 'ftyp', which contains data regarding a file type and a compatible type. According to the compatible type, normal play is possible in a corresponding decoder.

Each data of 'moov' 110 is configured as an object-based structure, and includes content information, such as a frame rate, a bit rate, an image size, etc., as well as synchronization information for supporting play functions such as Fast Forward (FF)/REWind (REW), etc., and other information used in playing a file. In particular, 'moov' 110 includes a total number of frames and a size of each frame of each of video data and audio data, such that when being played, the video data and the audio data may be provided by parsing 'moov' 110.

'mdat' 120 includes actual stream data according to each track, in which video data and audio data may be stored in corresponding basic units of data, such as frames, samples, etc.

The media file format based on the ISO/IEC 14496-12 standard shown in FIG. 1 is described as an example according to an embodiment of the present invention. However, any file format based on the ISO/IEC 14496-12 standard may also be used in accordance with embodiments of the present invention. In addition, file formats used in accordance with embodiments of the present invention may also be used with any storage form and recording media configured and utilized in a structured form, even if not being based on the ISO/IEC 14496-12 standard, in accordance with embodiments of the present invention.

FIGS. 2A through 2D illustrate structures of contents files according to an embodiment of the present invention.

Figure 2A:
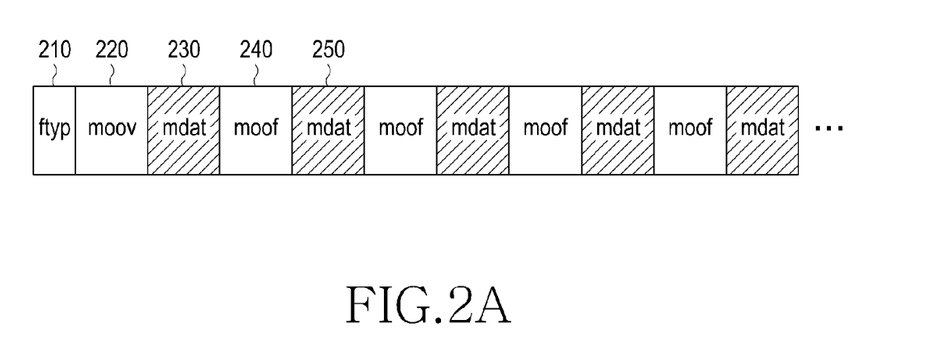
FIGS. 2A through 2D show storing formats of contents according to an embodiment of the present invention.

Referring to FIG. 2A, a contents file includes 'ftyp' 210, which includes data regarding a file type and a compatible type, 'moov' 220, which includes information used to play a file, 'mdat' 230, which includes actual stream data, extension box 'moof' 240 for play-related information of extension data of each data track, and 'mdat' 250, which includes actual extension stream data of each data track. When a file is generated and provided in a structure such as that shown in FIG. 2A, an apparatus for generating a contents file, when generating the file, configures basic setting information, contents configuration information, contents play-related essential information, etc., which are necessary for configuring the entire contents, in 'moov' 220 and configures a data stream for initialization in 'mdat' 230 to store first or transmit the file to a reception terminal. The contents file generating apparatus may configure a data stream generated in predetermined time units or predetermined sample/frame/data size units, or in different sizes according to contents generation environments in 'moof' 240 and 'mdat' 250 for play-related information regarding the data stream, and may store or transmit the data stream to the reception terminal. Before the contents file generating apparatus terminates data generation or file generation is terminated, the real-time generated data stream in the predetermined time units or predetermined sample/frame/data size units, or in different sizes according to contents generation environments may be repetitively configured in 'moof' 240 and 'mdat' 250 to be stored or transmitted to the reception terminal.

Figure 2B:
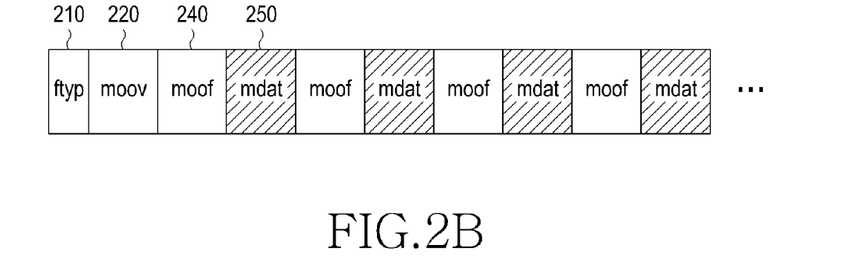

FIG. 2B illustrates an example of a structure of a contents file generated according to an embodiment of the present invention.

Referring to FIG. 2B, the contents file generating apparatus, when generating the file, configures basic setting information, contents configuration information, contents play-related essential information, etc., which are necessary for configuring the entire contents, in 'moov' 220, without configuring these information items in separate 'mdat' 230, and generates a data stream forming the actual contents in the predetermined time units or predetermined sample/frame/data size units, or in different sizes according to contents generation environments.

The play-related information regarding the generated data stream may be configured in 'moof' 240 and 'mdat' 250 and stored or transmitted to the reception terminal. Before the contents file generating apparatus terminates data generation or before file generation is performed, the real-time generated data stream in the predetermined time units or predetermined sample/frame/data size units, or in different sizes according to contents generation environments may be repetitively configured in 'moof' 240 and 'mdat' 250 to be stored or transmitted to the reception terminal.

Figure 2C:
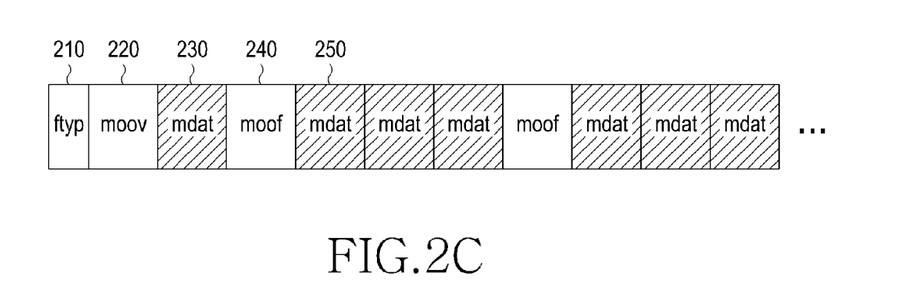

FIG. 2C illustrates a structure of a contents file generated according to another embodiment of the present invention.

Referring to FIG. 2C, the contents file generating apparatus, when generating the file, configures basic setting information, contents configuration information, contents play-related essential information, etc., necessary for configuring the entire contents in 'moov' 220, configures a data stream for initialization in 'mdat' 230, and initially stores or transmits the generated data to the reception terminal, if the generated data is to be delivered through one or more pre-processing methods or one or more encoders. The data stream generated in predetermined time units or predetermined sample/frame/data size units, or in different sizes according to contents generation environments may be configured in 'moof' 240 and 'mdat' 250 for play-related information regarding the data stream and stored or transmitted to the reception terminal. When performing delivery through one or more pre-processing methods or one or more encoders, the data stream forming the actual contents may be configured in each 'mdat' 250 as shown in FIG. 2C to be stored or transmitted to the reception terminal. The reception terminal, upon receiving the file configured in this manner, may selectively play or store the data stream through a method that is described in detail herein.

Figure 2D:
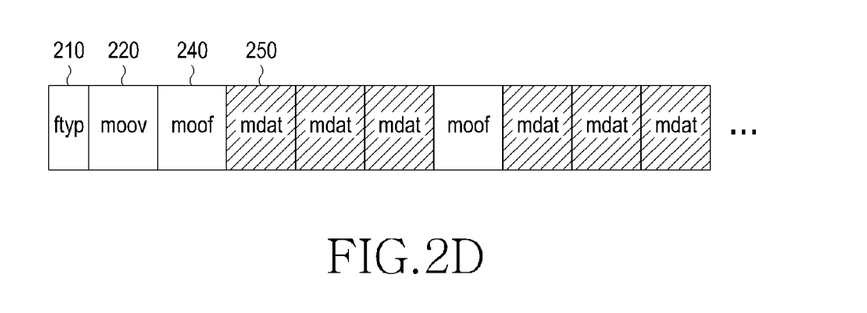

FIG. 2D illustrates an example of a structure of a contents file generated according to another embodiment of the present invention.

Referring to FIG. 2D, the contents file generating apparatus, when generating the file, configures basic setting information, contents configuration information, contents play-related essential information, etc., necessary for configuring the entire contents in 'moov' 220, without configuring the contents in separate 'mdat' 230, and generates a data stream forming actual contents in predetermined time units or predetermined sample/frame/data size units, or in different sizes according to contents generation environments, if the generated data is to be delivered through one or more pre-processing methods or one or more encoders. The data stream generated in the predetermined time units or predetermined sample/frame/data size units, or in different sizes according to contents generation environments may be configured in 'moof 240' and 'mdat' 250 for play-related information regarding the data stream, and may be stored or transmitted to the reception terminal. In case of delivery through one or more pre-processing methods or one or more encoders, the data stream forming the actual contents may be configured in each 'mdat' 250 to be stored or transmitted to the reception terminal, as shown in FIG. 2D.

The reception terminal having received the file configured in this way may selectively play or store the data stream through a method described in detail herein according to an embodiment of the present invention.

As described with reference to FIGS. 2C and 2D, when delivering data through one or more pre-processing methods or one or more encoders, a data stream forming actual contents may be configured in each 'mdat' 250 to be stored or transmitted to the reception terminal, but the data stream may also be configured as data tracks formed of switchable substitute groups or data chunks formed of switchable substitute groups as well.

The file formats described with reference to FIGS. 2A through 2D may be applied to any embodiment of the present invention, including the embodiments described below.

Figure 3:
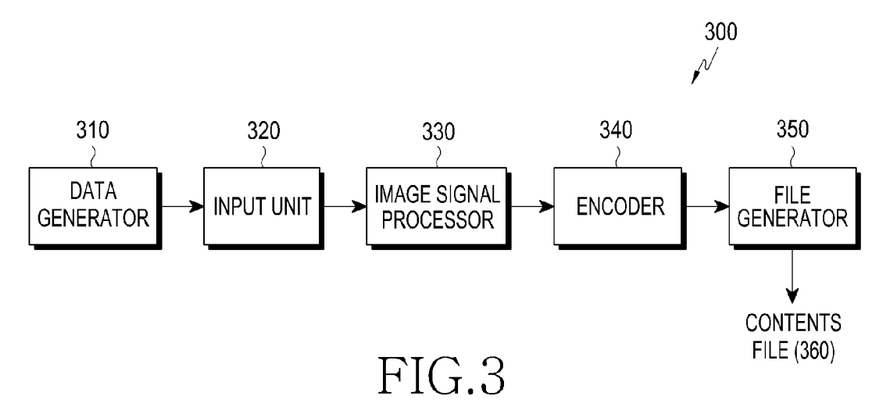
FIG. 3 is a block diagram of an apparatus for generating contents in real time according to an embodiment of the present invention.

FIG. 3 is a block diagram illustrating an apparatus for generating a contents file in real time according to an embodiment of the present invention.

Referring to FIG. 3, a contents file generating apparatus 300 according to an embodiment of the present invention includes a data generator 310, an input unit 320, an image signal processor 330, an encoder 340, and a file generator 350.

The data generator 310 is a device, such as an image generating device such as a camera, a camcorder, etc., an audio device, a text generator, etc., which generates unprocessed data of any of various types of information, such as text, video, audio, graphic, metadata, etc. that form contents. Data output from the data generator 310 is input to the input unit 320. The input unit 320 inputs the data received from the data generator 310 into the image signal processor 330.

Data input through the input unit 320 is pre-processed by the image signal processor 330. Herein, the pre-processing operations may include operations such as analog-to-digital conversion of an input image, data conversion using a necessary external input value to provide input data, etc.

The data pre-processed by the image signal processor 330 is delivered to the encoder 340. Although a storage medium for buffering is not separately shown between components in FIG. 3, buffering may be performed between the shown components according to a generation apparatus, a system, a data generation method, or the like, according to embodiments of the present invention.

The encoder 340 encodes the data delivered from the image signal processor 330. An encoding operation of the encoder 340 relates to data encoding, and may be omitted when necessary. If required, one or more encoders may be provided and correspondingly, service provisioning of different types/classes is possible.

The file generator 350 generates a contents file 360 by using the data encoded in the encoder 340. The file generator 350 may generate a file including real-time service related information described in accordance with embodiments of the present invention. The generated contents file 360 is continuously input or transmitted to an apparatus 400 for playing a contents file, and the contents file playing apparatus 400 plays and displays the real-time generated contents file 360. The contents file generated by the file generator 350 may be configured and generated in file structures described in FIGS. 2A through 2D in accordance with embodiments of the present invention.

Figure 4:
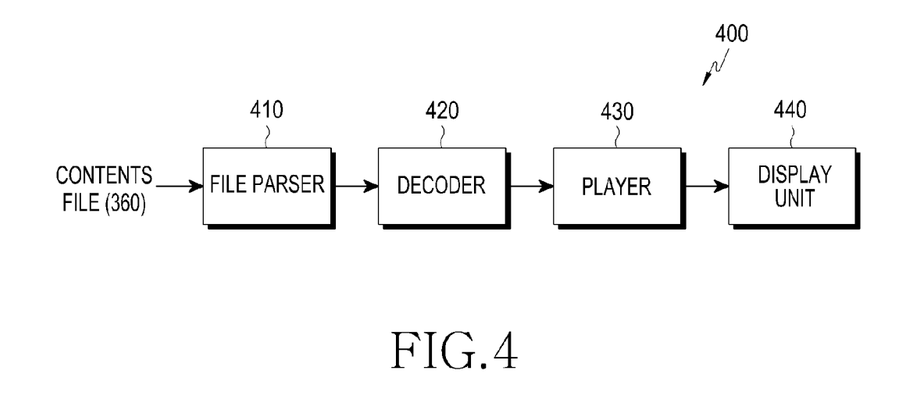
FIG. 4 is a block diagram of an apparatus for providing contents in real time according to an embodiment of the present invention.

FIG. 4 is a block diagram illustrating an apparatus for providing a contents file in real time, or the contents file playing apparatus, according to an embodiment of the present invention.

Referring to FIG. 4, a contents file playing apparatus 400 includes a file parser 410, a decoder 420, a player 430, and a display unit 440.

The file parser 420 receives and parses the contents file 360 generated by the file generator 350 of the contents file generating apparatus 300. The received contents file may be configured in a file structure such as that described with reference to FIGS. 2A through 2D and may be received by the contents file playing apparatus 400.

The file parser 420, after parsing information for providing a real-time service described in the present invention, extracts data of contents stored in each media data region.

The decoder 420 decodes data of the extracted contents. If the data of the extracted contents has been encoded using the encoder 340 in the contents file generating apparatus 300, the decoder 420 decodes the encoded data. The data encoded using one or more encoders may be decoded by respective corresponding decoders or decoding of selective data according to a system or a terminal may be possible. Thus, various types/classes of service provisioning is possible.

Although a separate storing unit is not shown in FIG. 4, a storage medium may exist between components illustrated in FIG. 4 for buffering or data storage in accordance with embodiments of the present invention.

The player 430 provides the data delivered from the decoder 420 by playing the delivered data with reference to the information analyzed by the file analyzer 410. The display unit 440 displays contents. The display unit 440 is a final output device that outputs data through a physical output device and provides the data to the user.

Figure 5:
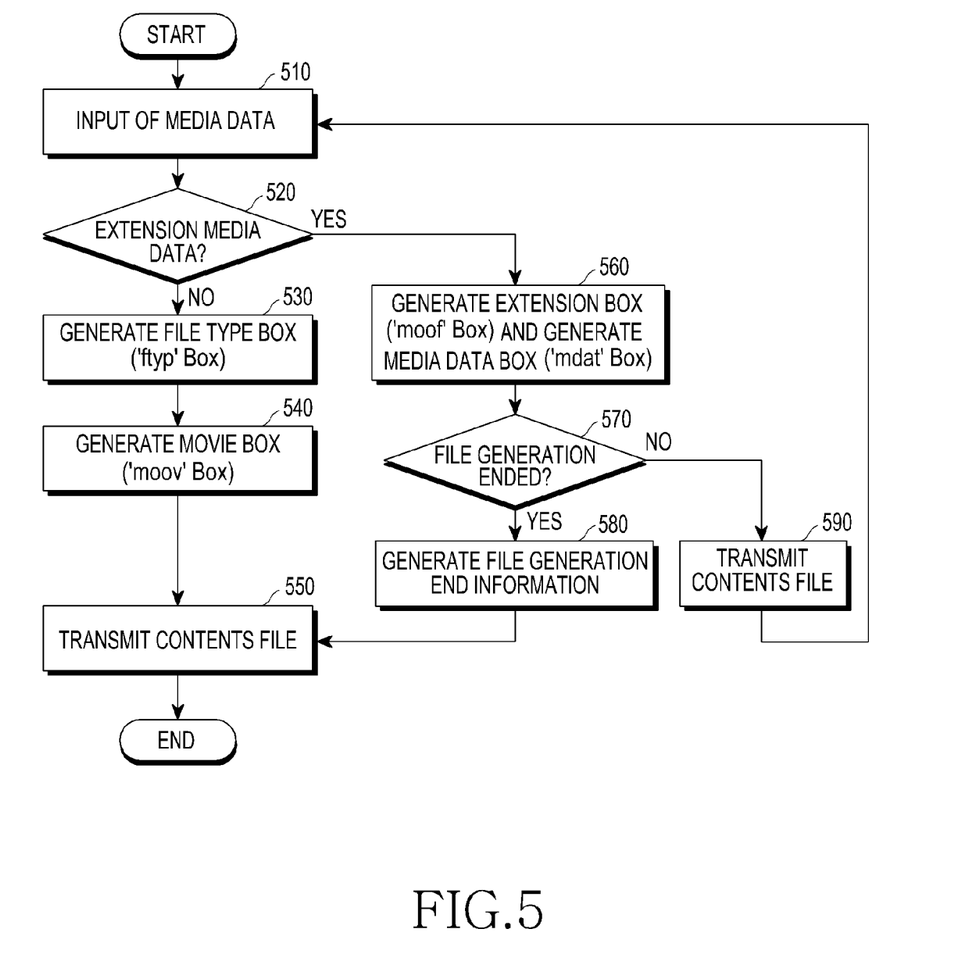
FIG. 5 is a flowchart showing a method for generating contents at an apparatus for generating a contents file according to an embodiment of the present invention.

FIG. 5 is a flowchart illustrating a method for generating a contents file by using the apparatus of FIG. 3 according to an embodiment of the present invention.

Referring to FIG. 5, upon receiving input of media data in step 510, the contents file generating apparatus 300 determines whether the input media data is extension media data related to a previously generated file in step 520. In performing the determination, a separate determination process as shown in FIG. 5 may be performed, or if the file generator 350 has already generated a file type box or a movie box related to the input media data, the file type box or the movie box may be checked. If the input data is not an extension media data, the contents file generating apparatus 300 generates an 'ftyp' including a file type and a compatible type in step 530, and generates a 'moov' including any information used for playing a file in step 540. The generation of the 'ftyp' in step 530 and the generation of the 'moov' in step 540 may be performed in a different order than the order depicted in FIG. 5, in accordance with embodiments of the present invention. The input media data is configured in a first media data box ('mdat'), such that the first 'mdat' may be stored as a contents file together with the file boxes generated in steps 530 and 540 or may be transmitted to the reception terminal or network in step 550. The media data has been generated, input, image-signal-processed, and encoded by the contents file generating apparatus described with reference to FIG. 3, such that it may be input to the file generator 350 described with reference to FIG. 3.

If another input extension media data in addition to the input data whose related information is generated in the movie box is detected in step 520, although not shown, information indicating that the extension media data will be added may be additionally generated. If the extension media data is additionally generated, the terminal may recognize the extension media data in advance and additionally generate the information indicating that the extension media data will be added.

The information indicating whether the extension media data is generated may be configured as a separate box or field to be included in the movie box ('moov'), or may be included in an extension box ('moof'). If extension configuration information varies with data tracks, corresponding data may be included as a new box or field in a track level box. If there is another input extension media data in step 520 in addition to the input data whose related information is generated in the movie box, the contents file generating apparatus 300 generates the extension box ('moof') and a media data box ('mdat' Box) in step 560. The extension box may further include real-time service related information described in the present invention, and the generation of the extension box ('moof' Box) and the generation of the media data box ('mdat' Box) may be performed in a different order according to a system. The contents file generating apparatus 300 determines whether the extension media data is the last data of a file to be generated in step 570. If the extension media data is the last data of the file to be generated, the contents file generating apparatus 300 generates file generation end information in step 580. The information indicating that the extension media data is the last data of the file to be generated may be generated by the data generator 310. For example, if an end button is pressed in a user's camcoder, corresponding information may be delivered for use to the file generator 300. The file generation end information generated in step 580 may be generated and stored as a separate field or box for the information in the extension box, or may be configured as a file level box. The corresponding information may be included in an extension box level information box or in each track level information box. The contents file generating apparatus 300 configures the input media data in a media data box ('mdat') in step 510 and stores the input media data as a content file together with the file boxes generated in steps 560 through 580 transmits the stored content file to the reception terminal or network in step 550.

If the extension media data is not the last data of the file in step 570, the contents file generating apparatus 300 configures the input media data in the media data box ('mdat') and stores it as a contents file together with the file boxes generated in step 560 or transmits the stored contents file to the reception terminal or network. The file generator 300 receives additionally input media data and repetitively performs steps following step 560.

If the media data input during file generation is delivered through one or more pre-processing methods or one or more encoders as described in FIGS. 2C and 2D, the extension box may be generated such that the extension box includes information about respective media data, in step 560. A pre-processing method, an encoding method, and media data generation-related information for respective media data may be included in the extension box. The media data generation-related information may be resolution, bandwidth, bit rate, frame rate, and so forth which media data targets. The pre-processing method, the encoding method, and the media data generation-related information for respective media data may be included as a separate field or flag in an existing box of the extension box, or may exist as a separate box. When the pre-processing method, the encoding method, and the media data generation-related information for respective media data are differently provided/input or generated for each track of respective media data, the corresponding information may be configured as a box or field of a track level and included in an extension box. Such information may be selectively stored or delivered according to the reception terminal or transmission environments.

Figure 6:
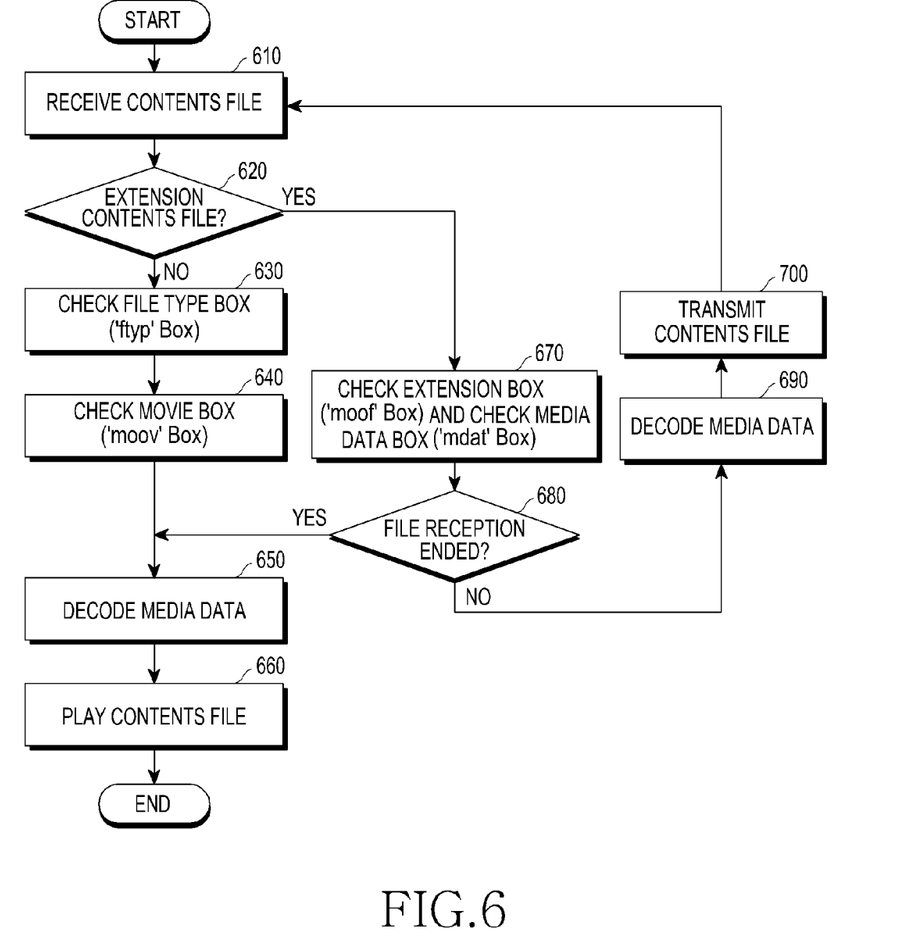
FIG. 6 is a flowchart showing a method for providing contents by using an apparatus for playing a contents file according to an embodiment of the present invention.

A method for providing a contents file received in real time according to an embodiment of the present invention is described as follows with reference to FIG. 6. FIG. 6 is a flowchart illustrating a method for providing a contents file using an apparatus for providing a contents file delivered/received in real time to/by the reception terminal of FIG. 4, according to an embodiment of the present invention.

Referring to FIG. 6, the contents file playing apparatus 400 receives a contents file in step 610. More specifically, the contents file is received by the terminal and delivered to the file parser 410 of FIG. 4. Upon receiving the contents file in step 610, the contents file playing apparatus 400 determines whether the received contents file is an extension contents file related to a previously received file in step 620. In performing the determination, a separate determination process as shown in FIG. 6 may be performed, or if the file parser 410 has already received and parsed a file type box or a movie box related to the received contents file, the determination may be performed therefrom. According to embodiments of the present invention, the extension contents file uses one extension box and its corresponding media data box as a minimum unit. If the file box of the received contents file is an extension ('moof') box, the contents file playing apparatus 400 may determine from the extension ('moof') box that the received contents is an extension contents file or may check actual extension stream data of each data track from the media data box ('mdat' Box), in step 670. If the received contents is not an extension contents file, the contents file playing apparatus 400 checks the file type box ('ftyp'), in step 630, to check information about a file type and a compatible type and checks the movie box ('moov') to check setting information for file provisioning or information related to contents playing in step 640. The contents file playing apparatus 400 proceeds to step 650 to decode an actual media stream of the media data box ('mdat') based on the information checked in steps 630 and 640, and provides the contents file to the user using a method such as playing media through an output device of the reception terminal, in step 660.

If the extension contents file of a contents file received in step 620 are determined to include the file type box and the movie box according to the results of steps 630 and 640, although not shown in FIG. 6, information indicating the extension media data will be added may be configured as a separate box or field and received through the movie ('moov') box or the extension ('moof') box, in accordance with embodiments of the present invention. If the extension media data is additionally generated, the terminal may recognize the extension media in advance and additionally generate the information indicating that the extension media data will be added. The information indicating whether the extension media data is generated may be configured as a separate box or field to be included in the movie box ('moov'), or may be included in an extension box ('moof'). If extension configuration information varies with data tracks, corresponding data may be included as a new box or field in a track level box. If there is another input extension media data in step 520 in addition to the input data whose related information is generated in the movie box, the contents file generating apparatus 300 generates the extension box ('moof') and a media data box ('mdat' Box) in step 560.

If the extension contents file of a contents file received in step 620 are determined to include the file type box and the movie box according to the results of steps 630 and 640, the contents file playing apparatus 400 checks the extension box ('moof') in step 670. The extension box may further include real-time service related information described in the present invention. The contents file playing apparatus 400 determines whether the received extension contents are the last received contents in step 680. If the received extension contents are the last received contents (i.e., there are no more contents to be received), the contents file playing apparatus 400 proceeds to step 650 to decode an actual media stream of the media data box ('mdat') based on the information checked in steps 630, 640, and 670 and provides the contents file to the user using a method such as playing through the output device of the reception terminal in step 660. Information indicating that the received extension contents are the last received contents may be generated and configured as a separate field or box for that information in the extension box, or may be configured and received as a file level box. The information may be received through the extension box level information box or may be included in each track level information box.

If the received extension contents file is not the last received file in step 680, contents file playing apparatus 400 repeatedly performs steps 670, 680, 690, and 700 to provide the contents file to the user through the output device of the reception terminal.

If media data of contents input during contents reception is data generated through one or more pre-processing methods or one or more encoders as described in FIGS. 2C and 2D, the reception terminal may check a pre-processing method, an encoding method, and media data generation-related information for respective media data in the process of checking the extension box in step 670. The media data generation-related information may include resolution, bandwidth, bit rate, frame rate, etc. corresponding to the media data. The pre-processing method, the encoding method, and the media data generation-related information for respective media data may be included as a separate field or flag in an existing box of the extension box, or may be configured or received as a separate box. If the pre-processing method, the encoding method, and the media data generation-related information for respective media data are input separately or generated for each track of respective media data, the corresponding information may be configured as a box or field of a track level and included in the extension box. The reception terminal may check the pre-processing method, the encoding method, and the media data generation-related information for respective media data to provide the contents file to the user by selectively decoding or playing the media data or to selectively store the contents file through such information, according to the reception terminal or transmission environments.

The real-time service related information described in step 350 of FIG. 3, step 410 of FIG. 4, step 560 of FIG. 5, and step 670 of FIG. 6 is described in more detail as follows.

When using a real-time generated service, an end time of the service cannot be predicted. Moreover, during service generation, information related to media data generation may be changed. For example, a private real-time broadcasting operator may change file use permit information or a contents parental rate for data generated during a particular time. Conventionally, in order to provide such information, the same level is applied to all contents forming a single file or an already-generated file is secondarily re-processed to input the information. However, according to embodiments of the present invention, real-time service related information is generated or changed during contents generation to store or deliver the generated information in real time, such that the reception side can receive contents suitable for the intention of a contents generator or user's conditions.

The real-time service related information may include, as described above, content rights, file use permit information, contents parental rate, data stream encryption-related information, language, etc.

The real-time service related information may include a pre-processing method, an encoding method, and media data generation-related information for respective media data, if the media data is generated through one or more pre-processing methods or one or more encoders as described above. The media data generation-related information may be resolution, bandwidth, bit rate, frame rate, codec, frame/sample size, etc., of the media data.

Information indicating that the file is continuously extended or there is no file to be received further as described in step 580 of FIG. 5 and in step 680 of FIG. 6 may be included in the real-time service related information.

The above-described real-time service related information may be configured as a separate field or flag of the information or as a separate box. The field or flag or box configured as the real-time service related information may be configured as a box or field at a track level, as a movie level or extension box level box or field, or as a file level box or field. In particular, the real-time service related information according to embodiments of the present invention may be included in an extension box related to provide extension contents or may be parsed together with information of the extension box for use in contents provisioning. The field or flag or box configured as described above is intended to provide/store/receive contents suitable for the intention of a contents generator, reception environments, and reception side's situation or conditions when the extension contents generated in real time are played/provided. Information generated in real time and stored or delivered according to embodiments of the present invention may be configured as a separate field or flag of respective information or as a separate box, such as the real-time service related information described above. The field or flag or box of respective information may be configured as a box or field of a track level, as a movie level or extension box level box or field, or as a file level box or field. In particular, real-time service related information according to embodiments of the present invention may be included in the extension box related to contents provisioning or may be parsed together with information of the extension box for use in contents provisioning.

A method for supporting search and request for information generated and provided in real time according to another embodiment of the present invention described. Information for supporting search and request for information generated and provided in real time described in the present invention may be further included in the above-described real-time service related information.

Conventional techniques provide an already generated file, such that information about data, such as an additional description corresponding to all data of the file, random access information, an additionally inserted advertisement, etc., are added and provided at the last portion of the already generated file or may be provided through a method such as file re-processing. However, conventional methods do not provide a way to configure contents including such information to provide the contents to the user in real time in a form that can be generated in real time to be stored or delivered.

To support a search and request for information that is generated and provided in real time, including the information about data such as additional description of the entire file data, random access information, additionally inserted advertisement, etc., such as described above, the additional information is included in an extension box related to provisioning of extension contents or is provided together with information of the extension box according to embodiments of the present invention.

To support requests such as a request for random access, information such as a number of a random-accessible frame or sample, a number or position of a main frame of an image (I frame), a random access time interval, etc., may be included in the extension box or provided together with the information of the extension box.

To support provisioning of additional description or additionally inserted information in real time generated data and file, the following information may be additionally included in the extension box or provided together with the information of the extension box. To provide additionally provided data in addition to basically provided data, a track to be used to provide additional data may be previously designated in the file structure. When the file is initially generated or the basic information is generated, a track to be used to provide the additional information is allocated in advance and information indicating this advance allocation may be configured and added as a new field or a new box in a movie level or track level box. When a track for providing the additional information is used, different tracks may be used according to data types of added information, such that a track provided to use the additional information is configured such that track switching is possible according to a data type to generate data by selecting a track according to a new handler type indicating that a corresponding track includes additional information and the data type of the additional information. The additional information described herein may be video and audio data of advertisement, etc., rather than data for description, such as metadata, etc.

A method for generating contents including additionally provided data adds information indicating a track that may include information about tracks providing the additional information to the movie ('moov') box or track ('track') level box, when initially generating a file. Such information may include information indicating a related track, in which corresponding added information is actually contained according to a handler type indicating a track including information about the added information and a data type of additional information. According to another example of a method for providing additionally provided data according to an embodiment of the present invention, a track referring ('tref') track is set to indicate a track related to a data stream/track of contents provided as a real-time service and a new handler type may be set to indicate that a track referring to track referring ('tref') is a track containing information which can be additionally provided.

In this regard, for the extension box or extension box related information, the number of samples in which additional information is to be included, time information including the additional information, reference information of an extension track that can contain the additional information, a handler type of a referring track, etc., may be included in the extension box or may be provided as the extension box related information together with an extension contents file.

The reception terminal, upon receiving the foregoing information, checks, from the received extension contents, time and the number of sample in which the additionally provided data has to be played, and connection information of the extension track containing the additional information, handler type information, etc., to check information of a movie box, a track of the movie box, information of an extension box, or track level extension data information of the extension box, thus providing the additionally provided information to the user.

When the information is provided through a third party or associated with a different service in corresponding time (i.e., the contents file is created by an entity distinct from the entity transmitting the media to the user), the extension box or extension box related information may be configured to include a field which provides information such as a related Uniform Resource Locator (URL), etc.

When a real-time service is provided, additional information may be provided reflecting an intention of a file generator or an intention of a file user. For example, when the additional information must be provided (e.g., when the additional information includes a prompt report or an emergency message into which the intention of a file generator can be reflected), the media may include a field indicating that the prompt report or the emergency message, in spite of other additional information, must be provided. The contents file may also include information that causes a data track including additional information not to be played or stored when a file user does not desire to receive or store the additional information. For example, a flag or field such as a 'priority' or 'mandatory play' field for additional data may also be provided.

A method for storing information generated and provided in real time (i.e., a contents file configured with media data of extension contents and received) according to another embodiment of the present invention is described as follows. The contents file configured with media data of extension contents and received according to this embodiment of the present invention may be stored in the following manner.

For example, in case of a file in which three extension boxes and three extension media data are configured in a basic file box including a file type box, a movie box, a media data box, etc., the three extension boxes, and the three extension media data may be stored in the basic file box including the file type box, the movie box, the media data box, etc., as received.

Information necessary for providing contents forming a file, such as the file type box, the movie box, each of the three extension boxes, and the media data box are separated, such that the file type box, the movie box, and each of the three extension boxes may be stored separately from basic media data, and each of the three extension media data.

By using a method for updating information of the movie box by adding information of the extension box for the extension contents to the movie box provided as the basic file box, the media data box including all of the file type box, the movie box, and the extension media data may be stored.

When contents are generated through one or more pre-processing methods or one or more encoders as described in the present invention, or when a contents file composed of media data including several switchable substitute groups is received, only media data suitable for reception environments may be selectively stored.

When contents are generated through one or more pre-processing methods or one or more encoders as described in the first embodiment of the present invention, or when a contents file composed of media data including several switchable substitute groups is received, information about media data to be stored in the extension box or extension box related information may be configured and included as a separate field or flag or as separate box. The information configured in this way may be used, for example, in the following manner. For example, when a first media data, a second media data, and a third media data, which are provided by substitution or switching, are configured and provided together in one extension box, information indicating that the first media data is received and played when the contents file is received and played in real time to the user, but data that is actually stored in the reception terminal and thus possessed is the third media data, which is provided through the extension box and the extension contents file related information, such that only the third media data can be selectively stored in the reception terminal. Such information may also be used when an additional information track is provided.

A method for providing or receiving a contents file configured as in FIGS. 2A through 2D according to another embodiment of the present invention through Peer-to-Peer (P2P) networking is described as follows. To provide a function described in the current embodiment, information described below is configured as a new field or a new separate box to be included in an extension box, or may be provided as the extension box related information together with the extension contents file. To provide the function, the file generator 350 of FIG. 3, when generating and delivering extension contents, also provides information about a sequential number of currently generated extension contents and contents media data configuration, and information about a sequential number of the entire extension contents generated so far and contents media data configuration through the extension contents. The information about the contents media data configuration may be information indicating whether media data of the generated contents are include first media data A, second media data B, and third media data C which can be provided after switching.

The terminal, upon receiving the information, operates as follows. For example, when information provided in real time starting at 1:00, a reception terminal that receiving a contents file at 1:40 checks the above-described information about contents media data configuration and thus recognizes that the currently received extension contents file is an extension contents file No. 20, the contents file received so far includes a basic data file No. 1 and extension contents Nos. 2 through 20, and extension contents files Nos. 5 through 10 are include substitutable media data having different resolutions. Through such information, the reception terminal can play contents following the contents No. 20, and at the same time, receive and store the contents Nos. 2 through 19 through P2P. In addition, through such information, the reception terminal, after completing play of the contents following the contents No. 20, may receive and store the contents Nos. 2 through 19 through P2P.

The basic data file including the movie box may be transmitted or provided in the course of providing the extension contents file by using a carousel scheme.

According to a conventional file format, when contents are not received according to sequentially increasing numbers, the receiving device determines that the file configuration is not valid, and file play is stopped and thus a service is not properly provided. However, by using the foregoing contents configuration information to provide a service, regardless of which extension contents are received, a previous file configuration of the received extension contents can be checked, thereby preventing a validity error in the file.

Although various embodiments have been described in detail herein, various changes are possible without departing the scope of the present invention. Therefore, the scope of the present invention is not limited to the described embodiment, but is defined according to the following claims and equivalents thereof.

The invention claimed is:

1. A method, performed by a transmitting device, for generating a contents file, the method comprising:
   generating, by a file generator, a contents file including contents configuration related information and real-time service related information such that the contents configuration related information and the real-time service related information are separated within the contents file; and
   transmitting, by a transmitter, the generated file to a receiving device,
   wherein the real-time service related information includes play related information about a data stream of a different size generated prior to termination of data generation of the contents file, prior to termination of file generation of the contents file, or in real time, based on one of a particular time unit, a particular sample/frame/data size unit, and a contents generation environment,
   wherein the real-time service related information is repetitively configured in at least one of a moof box and a media data box of the file.

2. The method of claim 1,
   wherein the contents configuration related information includes at least one of basic setting information, contents configuration information, and contents play related essential information.

3. The method of claim 2, wherein the contents file includes a movie box field including the contents configuration related information, a first media data box field including actual stream data corresponding to the contents configuration related information, an extension box field including the real-time service related information, and a second media data box field including actual extension stream data corresponding to the realtime service related information.

4. The method of claim 2, wherein the contents file includes a movie box field including the contents configuration related information, an extension box field including the real-time service related information, and a second media data box field including actual extension stream data corresponding to the real-time service related information.

5. The method of claim 2, wherein if the generated file is delivered through at least one pre-processing method or at least one encoder, the contents file includes a movie box field including the contents configuration related information, a first media data box field including a data stream for initialization, an extension box field including the real-time service related information, and a plurality of second media data box fields including actual extension stream data corresponding to the real-time service related information.

6. The method of claim 2, wherein if the generated file is delivered through at least one pre-processing method or at least one encoder, the contents file includes a movie box field including the contents configuration related information, an extension box field including the real-time service related information, and a plurality of second media data box fields including actual extension stream data corresponding to the real-time service related information.

7. The method of claim 2, wherein the real-time service related information includes at least one right of contents, file use permit information, contents parental rate, data stream encryption related information, and language.

8. The method of claim 2, wherein if media data is generated through at least one pre-processing method or at least one encoder, the real-time service related information includes at least one of a pre-processing method, an encoding method, and media data generation-related information for respective media data.

9. The method of claim 8, wherein the media data generationrelated information comprises at least one of resolution, bandwidth, bit rate, frame rate, codec, and frame/sample size of the media data.

10. The method of claim 2, wherein the real-time service related information includes information indicating that the file is continuously extended or there is no more file data to be received.

11. An apparatus for generating a contents file, the apparatus comprising:
a file generator for generating a contents file including contents configuration related information and real-time service related information such that the contents configuration related information and the real-time service related information are separated within the contents file; and
a transmitter for transmitting the generated file to a receiving device,
wherein the real-time service related information includes play related information about a data stream of a different size generated prior to termination of data generation of the contents file, prior to termination of file generation of the contents file, or in real time, based on one of a particular time unit, a particular sample/frame/data size unit, and a contents generation environment,
wherein the real-time service related information is repetitively configured in at least one of a moof box and a media data box of the file.

12. A method, performed by a receiving device, for generating a contents file, the method comprising:
receiving, from a transmitting device, a contents file generated including contents configuration related information and real-time service related information such that the contents configuration related information and the real-time service related information are separated within the contents file;
parsing, by a parser, the received file; and
playing, by an output unit, the file based on the parsing result,
wherein the real-time service related information includes play related information about a data stream of a different size generated prior to termination of data generation of the contents file, prior to termination of file generation of the contents file, or in real time, based on one of a particular time unit, a particular sample/frame/data size unit, and a contents generation environment,
wherein the real-time service related information is repetitively configured in at least one of a moof box and a media data box of the file.

13. An apparatus for generating a contents file, the apparatus comprising:
a receiver for receiving, from a transmitting device, a contents file generated including contents configuration related information and real-time service related information such that the contents configuration related information and the real-time service related information are separated within the contents file;
a parser for parsing the received file; and
a player for playing the file based on the parsing result,
wherein the real-time service related information includes play related information about a data stream of a different size generated prior to termination of data generation of the contents file, prior to termination of file generation of the contents file, or in real time, based on one of a particular time unit, a particular sample/frame/data size unit, and a contents generation environment,
wherein the real-time service related information is repetitively configured in at least one of a moof box and a media data box of the file.

* * * * *